(12) United States Patent  
Mekhtarian

(10) Patent No.: US 8,333,487 B2  
(45) Date of Patent: Dec. 18, 2012

(54) LED GROW LIGHT

(75) Inventor: George Mekhtarian, Hermosa Beach, CA (US)

(73) Assignee: Modern Woodworks, Inc., Canoga Park, CA (US)

( * ) Notice: Subject to any disclaimer, the term of this patent is extended or adjusted under 35 U.S.C. 154(b) by 149 days.

(21) Appl. No.: 12/928,952

(22) Filed: Dec. 24, 2010

(65) Prior Publication Data

US 2012/0162986 A1    Jun. 28, 2012

(51) Int. Cl.  
*F21V 29/00*    (2006.01)

(52) U.S. Cl. .................. 362/294; 362/249.02; 362/805
(58) Field of Classification Search ............ 362/249.02, 362/294, 311.02, 563, 800, 805  
See application file for complete search history.

(56) References Cited

U.S. PATENT DOCUMENTS 5,278,432 A * 1/1994 Ignatius et al. ................. 257/88

* cited by examiner

*Primary Examiner* — Jason Moon Han  
(74) *Attorney, Agent, or Firm* — Irving Keschner

(57) ABSTRACT

A light system for growing plants indoors comprising a light source mounted on a single, two sided FR4 based PCB board.

4 Claims, 4 Drawing Sheets

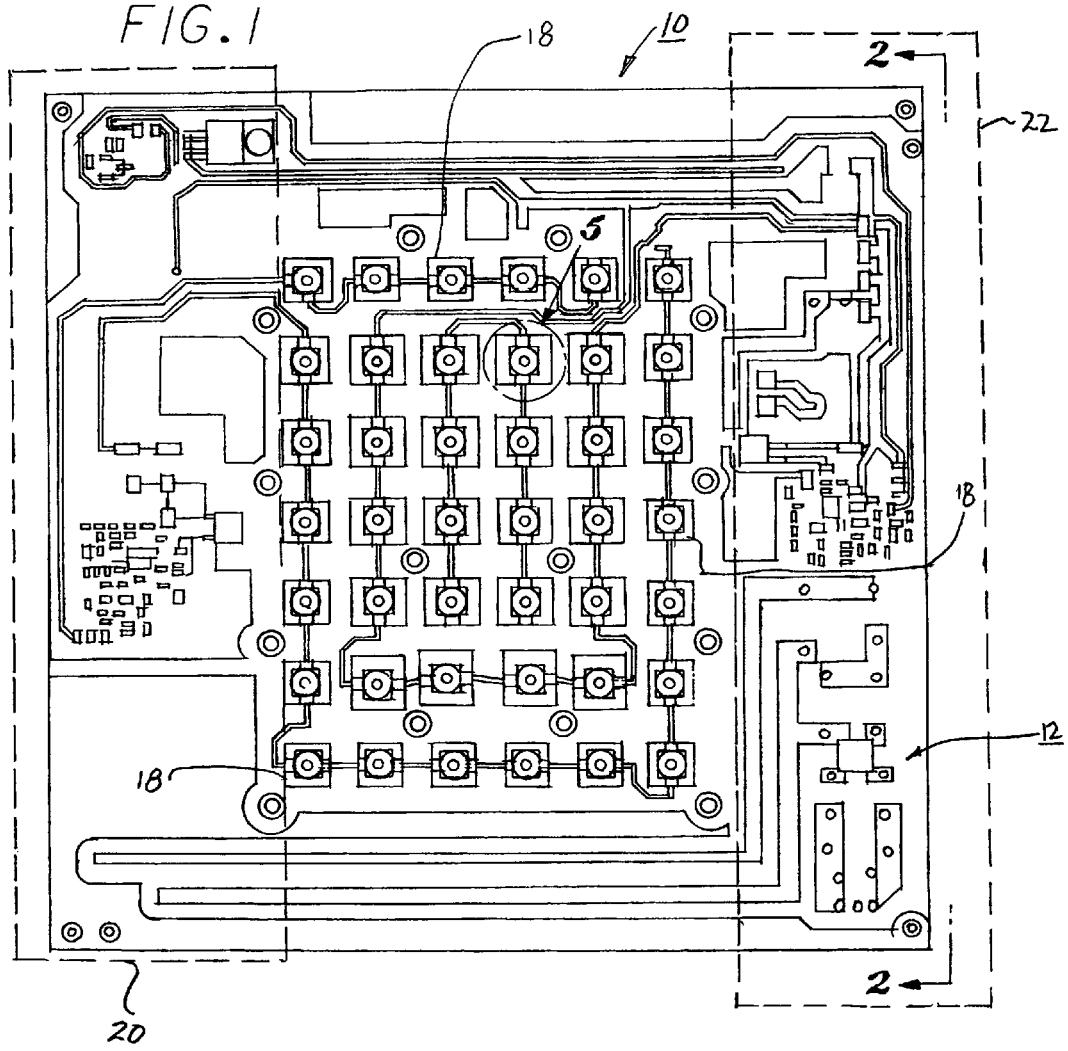
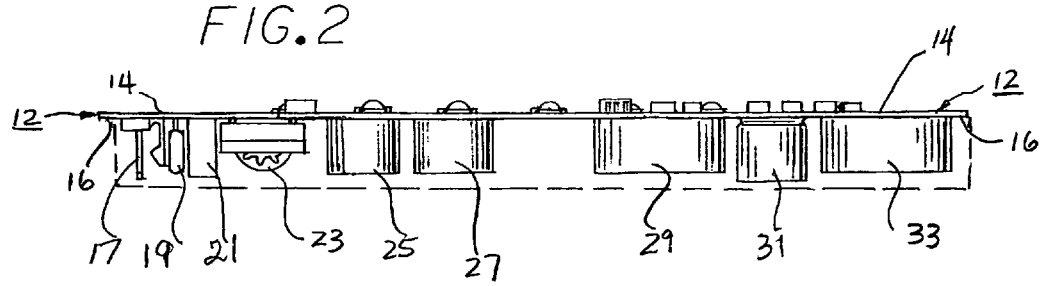

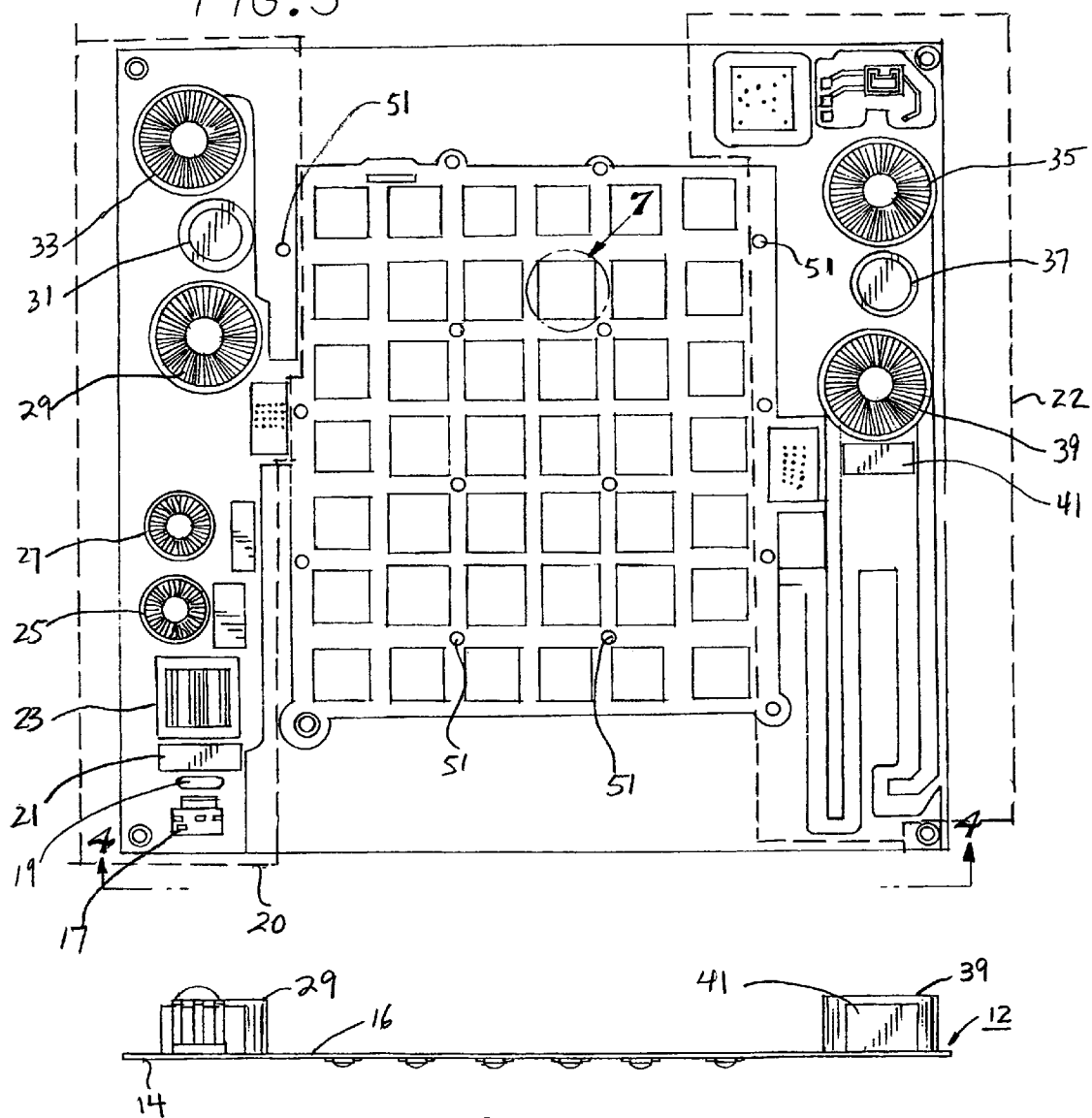

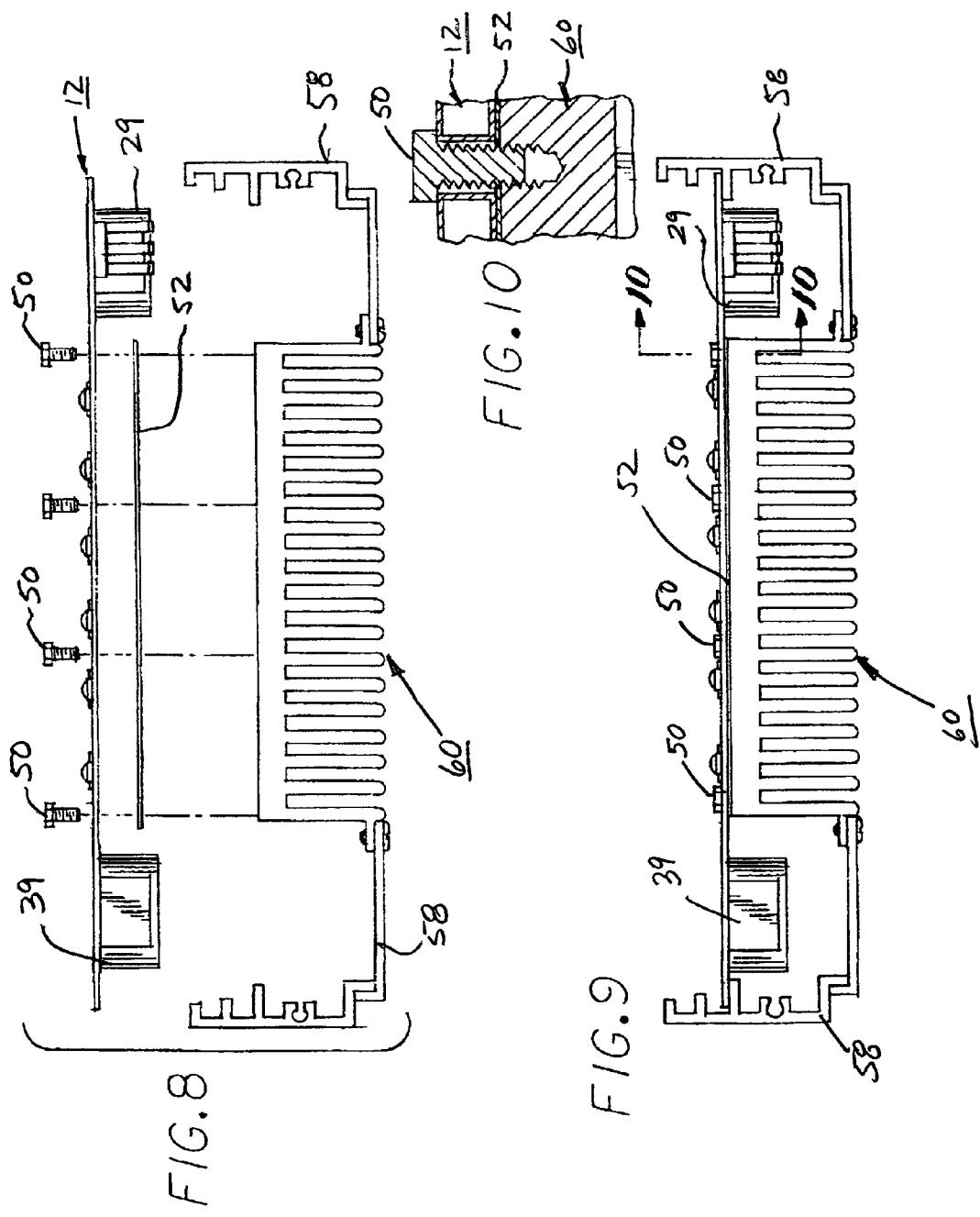

LED GROW LIGHT

BACKGROUND OF THE INVENTION

1. Field of the Invention

The present invention provides a LED light utilized in the field of indoor horticulture lighting, the light comprising at least three LEDs each emitting light of a different frequency.

2. Description of the Prior Art

High intensity discharge ("HID") lights have been used in indoor horticulture for many years. Specifically, there are two types of HID lights used for indoor growing: metal halide (MH) and high pressure sodium (HIPS) based systems. MH lights have a blue tint and are typically used during vegetative growth. HPS lights emit a yellowish/red tint used for the flowering portion of the grow process.

The field of light emitting diodes (LED) is a rapidly advancing technology that has the promise to significantly reduce power consumption for general lighting as well as for indoor horticulture. Over the last five years, ever brighter and more efficient LED emitters in the 3-5 W range have been developed which is a significant improvement over the LEDs of 10 years ago that did not exceed 50 mW. When used for indoor growing, LED based lights have the advantage of being higher efficiency than other lights. In addition, LEDs can be focused on the photo-synthetically active regions of the light spectrum, namely blue and red (400-500 nm and 600-700 nm respectively) without wasting energy on the green (500-600 nm) region which is not very useful to plants during the vegetative phase. LEDs emit light in a uni-directional fashion, eliminating the need for reflectors, further improving efficiency. Finally, LEDs have a lifetime of over 50,000 hours compared to less than 10,000 for HID systems, which reduces their overall cost of operation.

Key elements in designing an LED light fixture are:
1. Thermal management: LEDs are most efficient and last longer at lower temperatures.
2. Driver Circuit: LEDs are typically connected in series and driver circuits are typically switching mode power supplies with constant current control.
3. Primary optics (and secondary optics if necessary) to focus the light energy where needed.

High brightness LEDs (LEDs with power greater than 1 W) are typically mounted on metal core printed circuit boards (MCPCBs). However, MCPCBs are relatively new technology and typically cost three times or more compared to FR4 PCBs (fiberglass based PCBs). In addition, hole plating can not be accomplished with MCPCBs. In this regard, it is difficult to integrate the power supply/LED driver circuit with high brightness (HB) LED on the same MCPCB. Most HB LED light fixtures mount LEDs on an MCPCB then use a separate FR4 based PCB for the power supply/driver circuit resulting in higher assembly costs.

What is desired is to provide an improved LED circuit board for use in indoor plant growing operations, the LED circuit board integrating all the system components on a single PCB and wherein heat generated by the system components is significantly reduced.

SUMMARY OF THE INVENTION

The present invention provides a LED based optic fixture for growing plants wherein a single, two sided. FR4 based PCB is used which comprises the following:
1. Two switching mode power supplies (SMPS) rated at 75 W each;
2. Two constant current LED driver circuits;
3. High Brightness (HB) LEDs (two strings). Thermal vias are used to thermally connect the HB LEDs on one side of the PCB to the heat sink on the other side. In addition, the through hole and surface mounted technology (SMT) components are combined on the PCB to lower assembly cost.

The present invention significantly lowers the cost of manufacturing an LED light fixture by using:
1. A low cost FR4 based PCB;
2. A fully automated SMT based assembly; and
3. A single SMT placement and reflow solder run for the LED, SMPS and driver circuit.

The final assembly is faster and done at a lower cost since additional assembly and wiring for the LED driver circuits is not required and the overall design enables the device to be easily sealed from humidity.

DESCRIPTION OF THE DRAWINGS

For a better understanding of the present invention as well as other objects and further features thereof, reference is made to the following description which is to be read in conjunction with the accompanying drawing therein:

FIG. 1 is a top view of the LED grow light circuit board in accordance with the teachings of the present invention;

FIG. 2 is a side view along line 2-2 of FIG. 1;

FIG. 3 is a bottom view of the circuit board shown in FIG. 1;

FIG. 4 is a side view along line 4-4 of FIG. 3;

FIG. 8 is a simplified assembly view of the circuit board components shown in FIG. 1;

FIG. 9 shows the circuit board of FIG. 8 assembled; and

FIG. 10 is a view along line 10-10 of FIG. 9.

DESCRIPTION OF THE INVENTION

Figure 5:
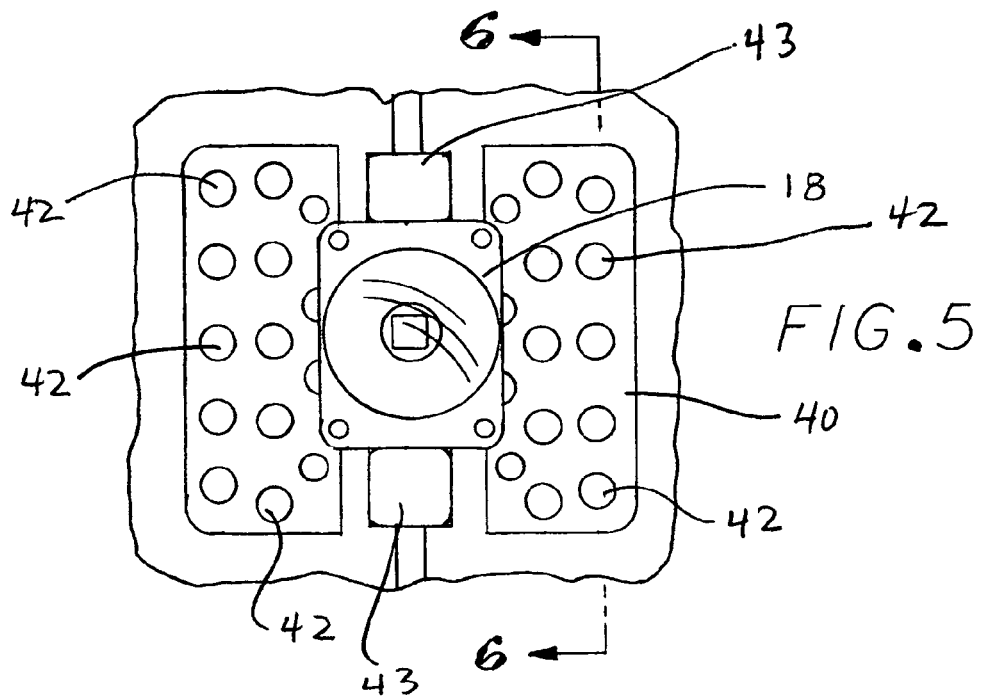
FIG. 5 is a detail of a portion of the circuit board shown in FIG. 1.

Referring now to FIGS. 1 and 2, a top view of the LED grow light fixture 10 of the present invention is illustrated. In accordance with the teachings of the invention, a single FR4 based two sided printed circuit board (PCB) 12 has a top layer 14 and bottom layer 16. A plurality of constant current LED emitter components 18 are mounted on layer 14 using conventional PCB component mounting processes, such as the surface mount technology (SMT) which allows SMT components to be more densely populated on a PCB. The LEDs generate radiation of five different wavelengths corresponding to the colors blue, deep blue, red, deep red and white. A pair of switching mode supplies 20 and 22 (preferably 75 W each) are formed on layer 14 of PCB 12 as illustrated. Since the total power of fixture 10 is 130 W, in order to maintain the proper dimensions of the, the design preferably is split such that each power supply drives half of the LEDs on the fixture. The LEDs are connected in series forming two distinct circuits driven by two separate power supplies. As shown in FIG. 2, all the through hole components 17 (connector), 19 (capacitor), 21 (capacitor), 23 (choke), 27 and 29 (inductors), 31 (capacitor), 33 and 35 (inductors), 37 (capacitor), 39 (inductor) and 41 (capacitor) are mounted on the bottom layer 16. The through hole components have leads that extend into plated holes (vias) and are soldered on top surface layer 14) (illustrated by reference numeral 24) are mounted to bottom layer 16. The through holes, or thermal vias, are also used to manage the heat generated by the LEDs and power supplies; the details of using the vias to manage the heat are described in application notes issued, for example by OSRAM Opto Semi conductors GmbH, Regensburg, Germany and Phillips Electronics, N.V., the Netherlands, suppliers of LED emitters. The thermal vias 42 thermally connect the high brightness LEDs mounted on top layer 14 to heat sink 60, secured to bottom layer 16. The vias 42 are plated holes formed on the LED pads 40 to provide heat conduction (all the holes shown in the figures are vias).

PCB 12 is mated to heat sink 60 using mounting screws 50 (FIG. 8) extending through a plurality of screw holes 51. A high thermal conductivity dielectric 52 (FIGS. 8 and 9) is inserted between PCB 12 and heat sink 60. A dielectric material which has been successfully utilized is the Bergquist SilPad 400.

PCB 12 has all the surface mount components on the same side as the LED emitters and the through-hole components, such as large inductors 29, 33, 35, and 39 are mounted on bottom layer 16 away from the LED emitters.

Figure 6:
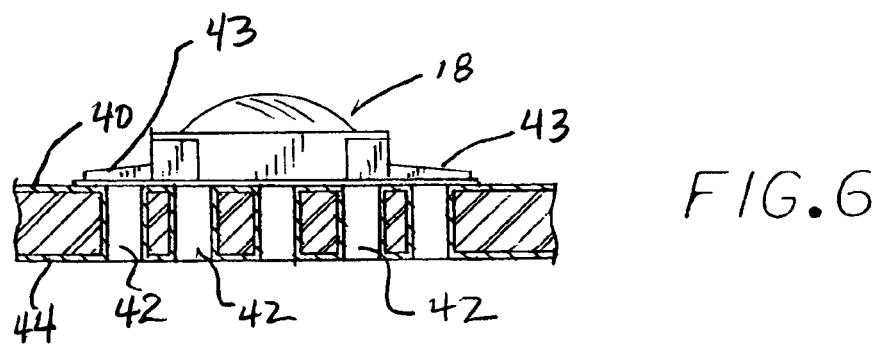
FIG. 6 is a view along line 6-6 of FIG. 5.

FIGS. 5 and 6 shows LED emitter 18 secured to heat sink pad layer 40 with vias 42 and FIG. 6, in addition, shows bottom layer heat sink 44 and LED conducting pads 43. It should be noted that the high brightness LEDs used on fixture 10 have three terminals that are soldered to the top layer 14 of PCB 12. The anode/cathode terminal 43 are electrically conducting whereas the slug (not shown in the figures) is used for thermal management purposes. Heat sink layers 40 and 44 are copper layers that are used as part of the thermal management (i.e. dissipation of heat) for fixture 10 and not for its electrical conducting characteristics. Heat sink 60 is preferably made of aluminum and is a separate component that combines with layers 40 and 44 to dissipate the heat generated during the time when fixture 10 is powered on. Referring to FIG. 6, the thermal path is as follows: heat from LED 18 travels through slug within the LED to top layer 40 through vias 42 to the bottom layer 44, through dielectric 52 to heat sink 60.

Figure 7:
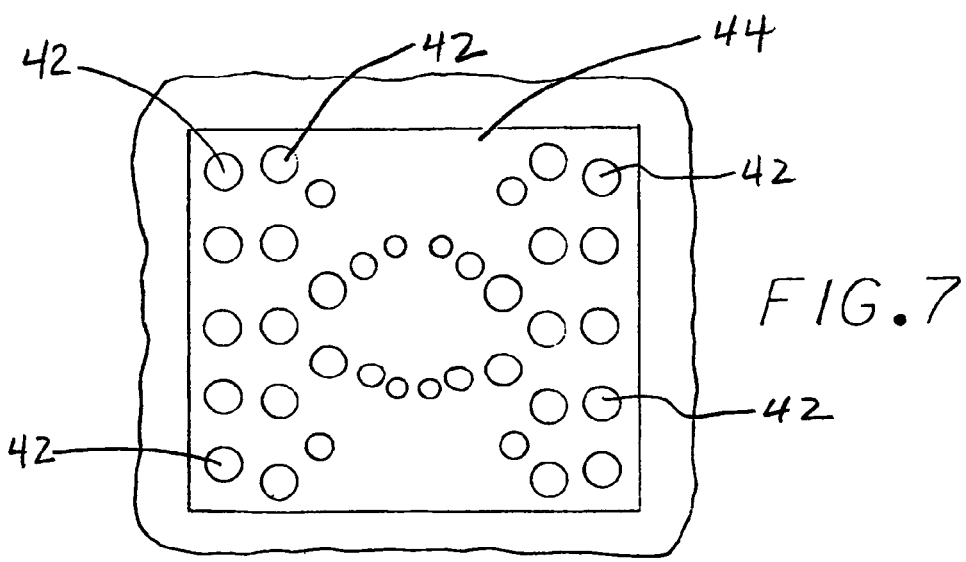
FIG. 7 is an enlarged area view at arrow 7 of FIG. 3, the other squares being identical thereto.

FIG. 7 is a bottom view of a LED emitter 18 showing a plurality of vias extending through heat sink layer 44.

FIG. 8 is an assembly view showing the various components that comprise fixture 10 and FIG. 9 shows those components assembled. Finally, FIG. 10 illustrates how mounting screws 50 join PCB 12 to heat sink 60 (extruded aluminum pieces 58 are attached to heat sink 60 and function as the casing for fixture 10).

It should be noted that prior art LED fixture designs employ separate SMPS and driver circuit PCBs. The driver circuits control the current furnished to the LEDs so that LED current is maintained substantially constant throughout their operation. Other designs manufacture LED drivers which encompass the SMPS and LED constant current driver circuit that are used in many LED light fixtures.

The present invention thus combines switching mode power supply (SMPS) technology on the same PCB that encompasses high brightness LEDs along with their thermal management components and driver circuitry provides a LED grow light that is unique and less costly than currently available systems.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A light fixture for use in growing plants indoors comprising:
    a printed circuit board (PCB) having first and second layers and a plurality of electrically conductive holes that extend between said first and second layers;
    a plurality of illumination sources for generating light of at least one wavelength for growing plants, said plurality of illumination sources mounted on said first layer of said circuit board;
    a plurality of first electrical components mounted to said second layer of said printed circuit board;
    a heat sink having top and bottom layers attached to said second PCB layer; and
    at least one power source for energizing said illumination sources mounted on said first layer of said PCB.

2. The fixture of claim 1 wherein each of said plurality of first electrical components are mounted to said second layer in operative relationship to corresponding ones of said holes.

3. The fixture of claim 1 wherein said printed circuit board comprises FR4 material.

4. The fixture of claim 1 wherein a sheet of dielectric material is interposed between the bottom layer of said PCB and the top layer of said heat sink.

* * * * *